(12) United States Patent
Morrell (10) Patent No.: US 8,055,927 B2
(45) Date of Patent: *Nov. 8, 2011

(54) STRUCTURE FOR ANALYZING DYNAMIC CPU VOLTAGE

(75) Inventor: Carl A. Morrell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 762 days.

This patent is subject to a terminal disclaimer.

(21) Appl. No.: 12/114,412

(22) Filed: May 2, 2008

(65) Prior Publication Data

US 2008/0294924 A1 Nov. 27, 2008

Related U.S. Application Data

(63) Continuation-in-part of application No. 11/752,533, filed on May 23, 2007, now Pat. No. 7,844,846.

(51) Int. Cl.
*G06F 11/30* (2006.01)
*G06F 7/02* (2006.01)

(52) U.S. Cl. ........ 713/340; 713/300; 713/310; 714/700; 714/819

(58) Field of Classification Search .................. 713/300, 713/310, 340; 714/700, 819
See application file for complete search history.

(56) References Cited

U.S. PATENT DOCUMENTS

| | | | |
|---|---|---|---|
| 5,919,262 A | 7/1999 | Kikinis et al. | |
| 6,094,367 A | 7/2000 | Hsu et al. | |
| 6,535,944 B1 | 3/2003 | Johari et al. | |
| 6,574,577 B2 | 6/2003 | Stapleton et al. | |
| 6,574,739 B1 | 6/2003 | Kung et al. | |
| 6,697,952 B1 | 2/2004 | King | |
| 6,874,083 B2 | 3/2005 | Sarangi et al. | |
| 6,924,710 B2 | 8/2005 | Wong et al. | |
| 7,127,623 B2 | 10/2006 | Potega | |
| 2004/0003301 A1 | 1/2004 | Nguyen | |
| 2005/0270005 A1* | 12/2005 | Horner | 323/283 |
| 2005/0283686 A1* | 12/2005 | Dart et al. | 714/54 |

(Continued)

FOREIGN PATENT DOCUMENTS

JP 8-030752 2/1996

OTHER PUBLICATIONS

U.S. Appl. No. 11/752,533, filed May 23, 2007, entitled: "System and Method for Analyzing Dynamic CPU Voltage".

*Primary Examiner* — Vincent Tran
(74) *Attorney, Agent, or Firm* — Patterson & Sheridan, LLP (57) ABSTRACT

A design structure embodied in a machine readable storage medium for designing, manufacturing, and/or testing a system is disclosed for monitoring a voltage supplied by a voltage regulation module to a processor in response to a dynamic VID generated by the processor. The voltage monitoring system monitors the voltage generated by the voltage regulation module to ensure the supplied voltage is within regulation thresholds. The voltage monitoring system acquires an analog reading of the supplied voltage and converts it to a digital value. If the VID changes during the conversion, the result of the A/D conversion is discarded. If the VID does not change, the voltage monitoring system accepts the result of the A/D conversion and compares the supplied voltage to the voltage expected in response to the VID. The voltage monitoring system may also compute the error between the actual and expected voltage for each accepted A/D conversion.

20 Claims, 5 Drawing Sheets

U.S. PATENT DOCUMENTS

| | | | |
|---|---|---|---|
| 2006/0007032 A1* | 1/2006 | Marino et al. | 341/155 |
| 2006/0043947 A1 | 3/2006 | Clavette et al. | |
| 2006/0055388 A1* | 3/2006 | Tang et al. | 323/284 |
| 2006/0145899 A1* | 7/2006 | Markowski et al. | 341/78 |
| 2006/0202557 A1 | 9/2006 | Menas et al. | |
| 2006/0227916 A1 | 10/2006 | Masui et al. | |
| 2007/0271473 A1* | 11/2007 | Hosomi | 713/300 |

* cited by examiner

STRUCTURE FOR ANALYZING DYNAMIC CPU VOLTAGE

CROSS-REFERENCE TO RELATED APPLICATION

This application is a continuation-in-part of U.S. patent application Ser. No. 11/752,533, filed May 23, 2007 now U.S. Pat. No. 7,844,846, which is herein incorporated by reference.

BACKGROUND OF THE INVENTION

1. Field of the Invention

The present invention is generally related design structures, and more specifically, design structures for monitoring and regulating the voltage supplied by a voltage regulation module to a processor in response to a dynamic VID.

2. Description of the Related Art

In the past, CPUs functioned on a static voltage. The static voltage supplied to a CPU could be monitored and easily compared to the expected voltage to make sure the supplied voltage was within a specified margin of error from the expected voltage. Now, CPUs are designed to operate on dynamic (variable) voltages driven by a voltage regulation module (VRM). A variable-voltage CPU outputs a dynamic "voltage identification" signal (VID) to the VRM in order to specify the voltage that the CPU requires at each moment. The VRM generates a dynamic voltage in response to the dynamic VID. The dynamic nature of the VID output presents unique challenges for monitoring the voltage to ensure proper regulation.

A microcontroller that is responsible for verifying that the CPU receives the correct voltage from the VRM must be able to compare the actual voltage with the voltage expected for the current VID. Accordingly, the microcontroller will first need to sense the voltage and convert the sensed voltage from an analog value to a digital value. While certain microcontrollers have a built-in analog to digital converter (i.e., an A/D converter), converting a voltage reading from an analog to digital value takes a considerably long amount of time (for example, milliseconds) in comparison with the timescale on which a VID may change (for example, microseconds). Accordingly, it is quite possible that the VID output to the VRM will change during an analog to digital conversion of the voltage being supplied to the CPU. Such a change in the VID will promptly cause a resulting change in the voltage and affect the analog to digital conversion. When this happens, the digital value is not representative of the voltage resulting from the VID.

Therefore, there is a need for an improved system and method for monitoring the voltage regulator module in order to verify that the CPU is receiving an actual voltage that is close to the expected voltage. It would be desirable if the system and method could be accomplished without disrupting the normal operation of the CPU and the VRM. It would be even more desirable if the system and method could be implemented without requiring any customized or expensive hardware components.

SUMMARY OF THE INVENTION

A first embodiment of the invention provides a method of monitoring a dynamic processor voltage. A voltage is supplied to a processor in relation to the value of a VID output from the processor. An analog value of the supplied voltage is converted to a digital value. Any change in the value of the VID signal during the analog to digital conversion of the supplied voltage is detected. The digital value of the supplied voltage and the value of the VID signal during the analog to digital conversion are accepted unless a change in the value of the VID signal is detected during the analog to digital conversion. An error is computed between the accepted digital value of the supplied voltage and a voltage expected in response to the accepted value of the VID.

A second embodiment of the invention provides a system for monitoring a dynamic processor voltage. A voltage regulation module supplies a voltage to a processor in relation to a VID generated by the processor. An analog to digital converter converts an analog value of the supplied voltage to a digital value. A change detection module detects any change in the dynamic VID during the analog to digital conversion. If no change in the VID is detected during the conversion, then a validation module compares the supplied voltage to a voltage expected in relation to the VID and computes a difference between the expected voltage and the supplied voltage.

A third embodiment is a computer program product comprising a computer usable medium including computer usable program code for analyzing a processor voltage supplied to a processor in relation to the value of a dynamic VID signal output from the processor. Computer usable program code receives a digital value resulting from an analog to digital conversions of the supplied processor voltage, detects any change in the value of the VID signal during the analog to digital conversion, accepts the digital value of the supplied processor voltage and the value of the VID signal during the analog to digital conversion unless a change in the value of the VID signal is detected during the analog to digital conversion, and computes an error between the accepted digital value of the supplied processor voltage and a voltage expected in response to the accepted value of the VID.

A fourth embodiment is a design structure embodied in a machine readable storage medium for at least one of designing, manufacturing, and testing a design. The design structure generally includes a system for monitoring a dynamic processor voltage. The system generally includes a voltage regulation module for supplying a voltage to a processor in relation to a VID generated by the processor, an analog to digital converter for converting an analog value of the supplied voltage to a digital value, a change detection module for detecting any change in the dynamic VID during the analog to digital conversion, and a validation module for comparing the supplied voltage to a voltage expected in relation to the VID and computing a difference between the expected voltage and the supplied voltage.

Other embodiments, aspects, and advantages of the invention will be apparent from the following description and the appended claims.

DETAILED DESCRIPTION OF PREFERRED EMBODIMENTS

The present invention includes highly reliable and accurate systems and methods for monitoring, analyzing, and verifying the proper regulation of a voltage supplied to a processor in response to a dynamic VID generated by the processor. In one embodiment, a voltage monitoring system monitors the voltage generated by the voltage regulation module to ensure the supplied voltage is within regulation thresholds. The voltage monitoring system converts an analog reading of the supplied voltage to a digital value. This analog to digital conversion takes time, during which the VID may change. If the VID changes during the conversion, the result of the A/D conversion is discarded as being potentially inaccurate and unreliable. If the VID does not change during the conversion, the voltage monitoring system accepts the result of the A/D conversion and compares the resulting digital value of the supplied ("actual") voltage to the voltage expected in response to the particular VID value.

The system may compute the error between the actual and expected voltage for each accepted A/D conversion. The system may then accumulate these errors, and may average them. The accumulated error may be compared with regulation thresholds, such as a predefined allowable margin of error. If the accumulated error exceeds regulation thresholds, an alert may be generated. Remedial action may be taken depending on the degree and severity of the accumulated error. Examples of such remedial action include throttling the processor, powering off the processor or the voltage regulation module, shifting workload from the processor to another processor in a data center, or even powering off the hardware on which the processor and voltage regulation module may reside. Ultimately, the voltage regulation module may need to be replaced if it is determined to be the cause of voltage regulation errors. Alternatively, the processor may need to be replaced if it is determined to be incorrectly generating the VID.

The invention thereby provides reliable and accurate monitoring of voltage in a modern, variable-voltage processor. By monitoring the VID for any changes during the A/D conversion of each voltage reading, the accurate voltage readings (taken during a period in which no VID change was detected) may be accepted and used for error analysis. Meanwhile, the inaccurate voltage readings (taken during a period in which a VID change was detected) may be discarded. By accepting only the accurate voltage readings for subsequent error analysis, a more complete and correct representation of processor and voltage regulation module performance may be obtained.

Figure 1:
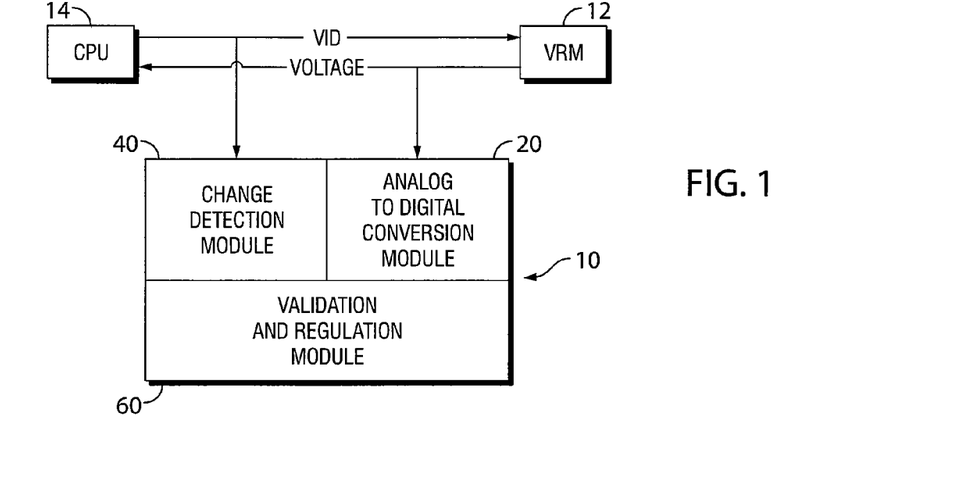
FIG. 1 is a schematic diagram of a voltage monitoring system for verifying that a voltage regulation module continuously supplies the correct voltages to a CPU in response to VID values generated by the CPU.

FIG. 1 is a schematic diagram of a voltage monitoring system (VMS) 10 for verifying that a voltage regulation module (VRM) 12 continuously supplies the correct voltage to a processor ("CPU") 14 in response to VID signals generated by the CPU. The voltage to the processor is considered to be correct if it is within an allowable margin of error of the voltage that is expected for any given VID. The voltage monitoring system 10 may be a subsystem of a computer system that includes the VRM 12 and the CPU 14. For example, the VMS 10, VRM 12, and CPU 14 may be included together on a motherboard. The CPU 14 generates a dynamic VID, which changes over time according to the CPU's changing voltage needs. The VRM 12 attempts to supply the requested voltage corresponding to the value of the VID at each moment in time. Thus, in response to each change in the value of the VID, the VRM 12 adjusts the voltage accordingly.

The voltage monitoring system 10 includes an analog to digital ("A/D") converter 20 for converting analog voltage readings to digital values, a change detection module 40 for detecting any change in the VID value during an A/D conversion, and a validation and regulation module 60 for verifying that the supplied voltage is within an acceptable margin of error of the requested voltage. If there is a VID change during an A/D conversion, the validation and regulation module 60 ignores the result of the A/D conversion. If there is no VID change during an A/D conversion, the validation and regulation module 60 compares the result of the A/D conversion (which is a digital representation of the supplied voltage) to the voltage expected in response to the value of the VID during that A/D conversion. The voltage monitoring system 10 may include one or more presently available microcontrollers, such as a service processor, having a built-in A/D converter, change detection circuitry, or both. Software such as firmware included with the microcontroller or a driver managed by a computer operating system may provide the necessary algorithms for monitoring and controlling the supplied voltage according to the invention.

The CPU 14 may be capable of generating a discrete set of VID values corresponding in one-to-one relationship with a discrete set of voltage values. The expected relationship between VID and voltage may be described, for example, by a table or characteristic curve relating each VID value to its corresponding voltage value for the given CPU 14, which may be determined in accordance with VRM design specifications or initial testing. The expected voltage may be obtained as a "table lookup" for a given VID value. An electronic table (or its equivalent) may be accessed, which relates the values of the VID to their corresponding voltage values. The CPU 14 outputs the value of the VID that corresponds to the voltage it needs at any point in time. The CPU 14 may select the value of the VID to output according to the processing load placed upon it. Also, the CPU 14 may select the value of the VID without necessarily determining the literal voltage value it requires. The VRM 12 may electronically determine the requested voltage by referring to the table or characteristic curve associated with the CPU 14, but most likely the VRM is simply designed via hardware to perform in a manner consistent with such a table or curve. An example of a characteristic VID/Voltage curve for a CPU is included in the graph of FIG. 2. The VID/Voltage relationship may be a step function, which is a piecewise constant function having only finitely many pieces.

Figure 2:
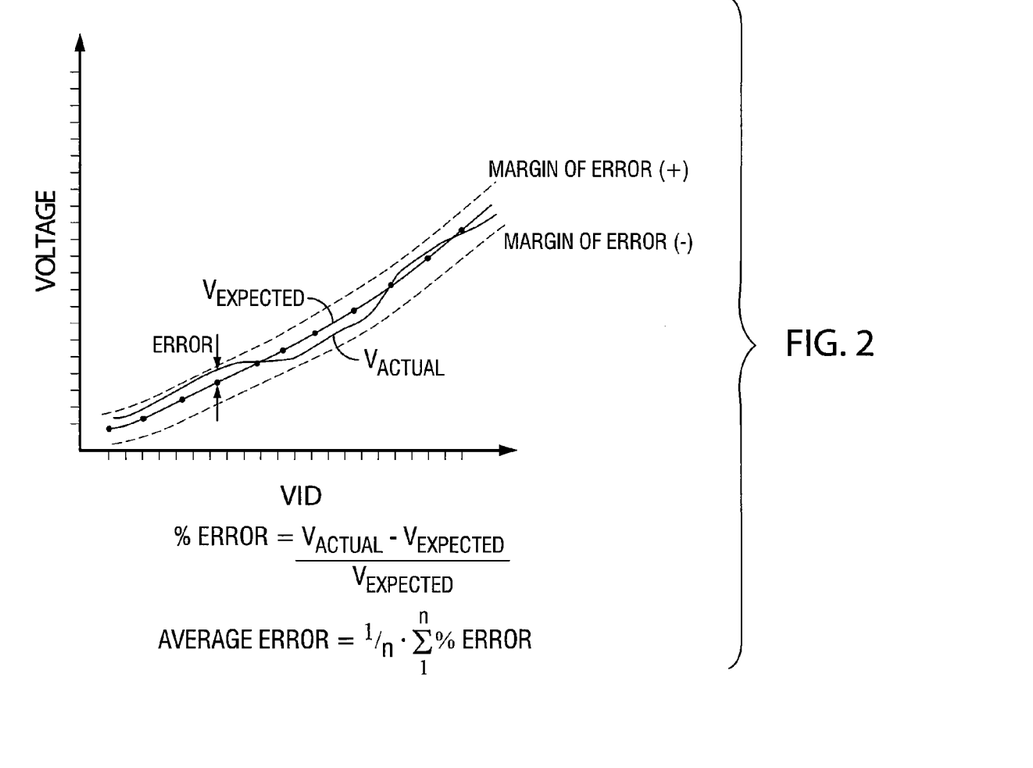
FIG. 2 is a graph qualitatively comparing actual and expected voltage values over a range of VID values for a hypothetical system.

FIG. 2 is a graph qualitatively comparing actual and expected voltage values over a range of VID values for a hypothetical system. The horizontal axis of the graph is the VID value and the vertical axis is the Voltage value. The curve labeled "$V_{EXPECTED}$" is the characteristic curve for the CPU of the hypothetical system. The $V_{EXPECTED}$ curve comprises a set of points that each relates a discrete VID value (horizontal axis) with its corresponding voltage value (vertical axis). Thus, the expected voltage for each VID value can be determined from the $V_{EXPECTED}$ curve. It should be recognized that essentially the same information may be kept in a table or other electronically storable and electronically accessible format.

The $V_{ACTUAL}$ curve plots the actual voltage supplied by a VRM in response to VID values. As shown, the $V_{ACTUAL}$ curve closely, but not exactly, tracks the $V_{EXPECTED}$ curve. The Error shown in the graph is the magnitude of the difference between the actual voltage and the expected voltage at a particular VID. Exemplary error analysis equations are given below the graph. In this case, the % Error is the percentage that the actual voltage deviates from expected voltage. The Average Error is equal to the sum of the % Error values divided by the number "n" of those values. An acceptable margin of error (+ and −) is also shown. In this example, the actual voltages are within the margin of error, as desired. Other error analysis principles and techniques are known generally in the art, including a variety of statistical error analysis approaches.

Figure 3:
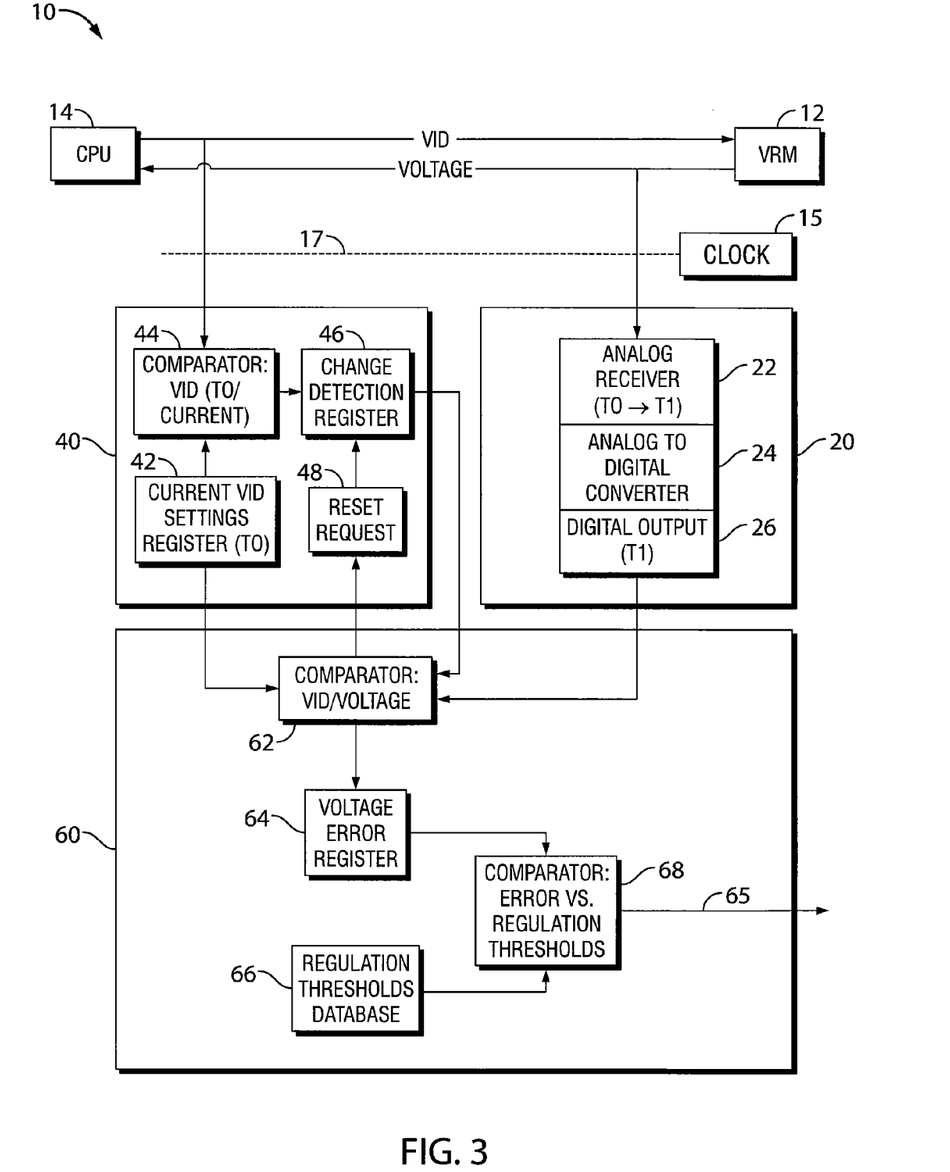
FIG. 3 is an expanded schematic diagram further detailing the voltage monitoring system of FIG. 1.

FIG. 3 is an expanded schematic diagram further detailing the voltage monitoring system 10 of FIG. 1. A system clock 15 is included for metering events or actions over time within the system 10. The system clock 15 generates a clock signal 17 that may be used to coordinate the actions of the system 10, as well as time system events such as A/D conversions. The A/D conversion module 20 includes a receiver portion 22 for receiving an analog reading of the voltage generated by the VRM 12, an A/D converter core 24 for converting the analog voltage reading to a digital value, and a digital output portion 26 for outputting the digital value to the validation and regulation module 60. The digital value provided by the A/D conversion module 20 may directly indicate the value of the voltage. Alternatively, the digital value may require a "table lookup" or mathematical operation to arrive at the actual voltage it represents. In any case, the digital value may be regarded as a "digital equivalent" of the analog voltage reading, in that the voltage may be determined, either directly or indirectly, from the digital value converted from the analog voltage reading.

In one practical embodiment, the A/D conversion module 20 may be included with a microcontroller. The A/D conversion module 20 may be capable of performing many A/D conversions in rapid succession. Nevertheless, the speed of the A/D conversions may still be considered "slow" in comparison to the exceedingly fast performance speed of other system components and events. For example, each A/D conversion may span a time interval on the order of microseconds or even milliseconds. Meanwhile, the value of the dynamic VID generated by the CPU 14 may fluctuate more rapidly, such as on the order of nanoseconds, or at least has the potential to change before completion of a particular A/D conversion. Thus, if a particular A/D conversion is begun at a time "T0" and completed at a time "T1," the VID at T1 may be different than the VID at T0. Alternatively, the value of the VID may be the same at T1 as it was at T0, but may have changed at least once during the A/D conversion, i.e. between T0 and T1. If such a change in the VID were to occur during the A/D conversion, the digital value provided by the digital output 26 would be an unreliable or inaccurate indicator of the voltage actually requested by the CPU 14 at any particular point in time during the time interval from T0 to T1.

The change detection module 40 monitors the VID generated by the CPU 14 and detects any change in the VID during each A/D conversion performed by the A/D conversion module 20. The change detection module 40 receives the VID as an input. At each time T0, the VID at T0 is stored in a VID settings register 42. The VID settings register 42 may be, for example, a set of latches included with a microcontroller. A first comparator 44 continuously monitors and compares the value of the VID being received from the CPU 14 to the value of the VID stored in the register 42. If a change occurs, the first comparator 44 signals a change detection register 46 in response. The change detection register 46 may contain a change detection "bit" that can be toggled between binary digits. For example, a "0" bit may reflect no VID change, which may be toggled to a "1" bit to indicate a VID change. A reset request element 48 may also be included with the change detection module 40. The reset request element 48 may be triggered by the validation and regulation module 60 to selectively reset the change detection register 46 at the beginning (T0) of each A/D conversion.

The validation and regulation module 60 is in communication with both the A/D conversion module 20 and the change detection module 40. The validation and regulation module 60 includes a second comparator 62. Inputs to the second comparator 62 include the value of the VID and the digital value of the voltage to the CPU 14 during each A/D conversion period. The value of the VID may be provided, as shown, by the VID settings register 42. Alternatively, the value of the VID may come from elsewhere in the change detection module 40, or even directly from the VRM 12 at some time during the applicable time interval during which no VID change was detected.

If a VID change is reflected in the VID register 46 during any A/D conversion, the value of the VID and the digital value representative of the voltage may be ignored and discarded. A VID change during the A/D conversion would otherwise render unreliable any comparison of the VID output by the CPU 14 to the voltage actually supplied to the CPU 14. If these values are discarded, the validation and regulation module 60 may activate the reset request 48 to reset the change detection register 46. For example, in response to the reset request 48, the change detection register 46 may be toggled from 1 to 0. The validation and regulation module 60 may then wait for a subsequent A/D conversion and again perform a check to see if a VID change was reflected during that subsequent A/D conversion. This cycle may be repeated as often as necessary, until the occurrence of an A/D conversion during which no VID change is detected.

If no VID change is reflected in the VID register 46 as having occurred during an A/D conversion, the comparator 62 compares the value of the VID (or, more particularly, the expected voltage corresponding to the value of the VID) to the digital value representative of the actual voltage during that A/D conversion. An acceptable margin of error may be pre-established for a given CPU/VRM pair. In a properly regulated system, the voltage supplied by the VRM 12 will typically be within the margin of error of the voltage requested by the CPU 14. For example, during a particular time interval from T0 to T1, the CPU 14 may request a desired voltage of 1.5V by outputting a VID value corresponding to 1.5V. In response, the VRM 12 may have supplied an average of 1.467V. This error may be expressed as 2.2%=(1.5−1.467)/1.5×100%. The error after each target time interval from T0 to T1 may be recorded in an error register 64. The average error for each time interval during which no VID change was detected may also be stored in the voltage error register 64. The individual errors may then be analyzed in terms of the average error, or by using other statistical error analysis techniques or characteristics known in mathematics, science, and engineering. The errors may then be compared to regulation thresholds provided in a database 66. The regulation threshold database 66 may be provided, for example, in a technical specification for a particular microcontroller on which the system 10 is embodied. A comparator 68 is included for comparing the voltage errors recorded in the error register 64 to the regulation thresholds specified in the regulation thresholds database 66.

The comparator 68 may output a signal 65 representative of the comparisons it performs and/or of errors recorded in the voltage error register 64. This signal 65 may be received by another system or subsystem for further analysis. For example, the signal 65 may be sent to and processed by management software residing on a workstation that provides global management and support for multiple servers. The signal 65 may alternatively be output locally to a single computer or device on which the system 10 may reside. If the average of the errors recorded by the voltage error register 64 exceeds the threshold(s) or margin of error specified in the regulation thresholds database 66, such as +/−10%, then the signal 65 generated may include an alert. This alert may trigger or at least indicate the need for corrective action, such as a request for a system administrator to swap out faulty components. For example, the VRM 12 may be faulty, unable to provide the voltage requested by the CPU 14 within the margin of error specified by the regulation thresholds database 66. In extreme cases, such as where the voltage supplied is far in excess of safety requirements, or where a loss of important data is imminent, a more serious, evasive course of action may be followed. Evasive action may include, for example, shutting down the CPU 14 and related components or subsystems.

Figure 4:
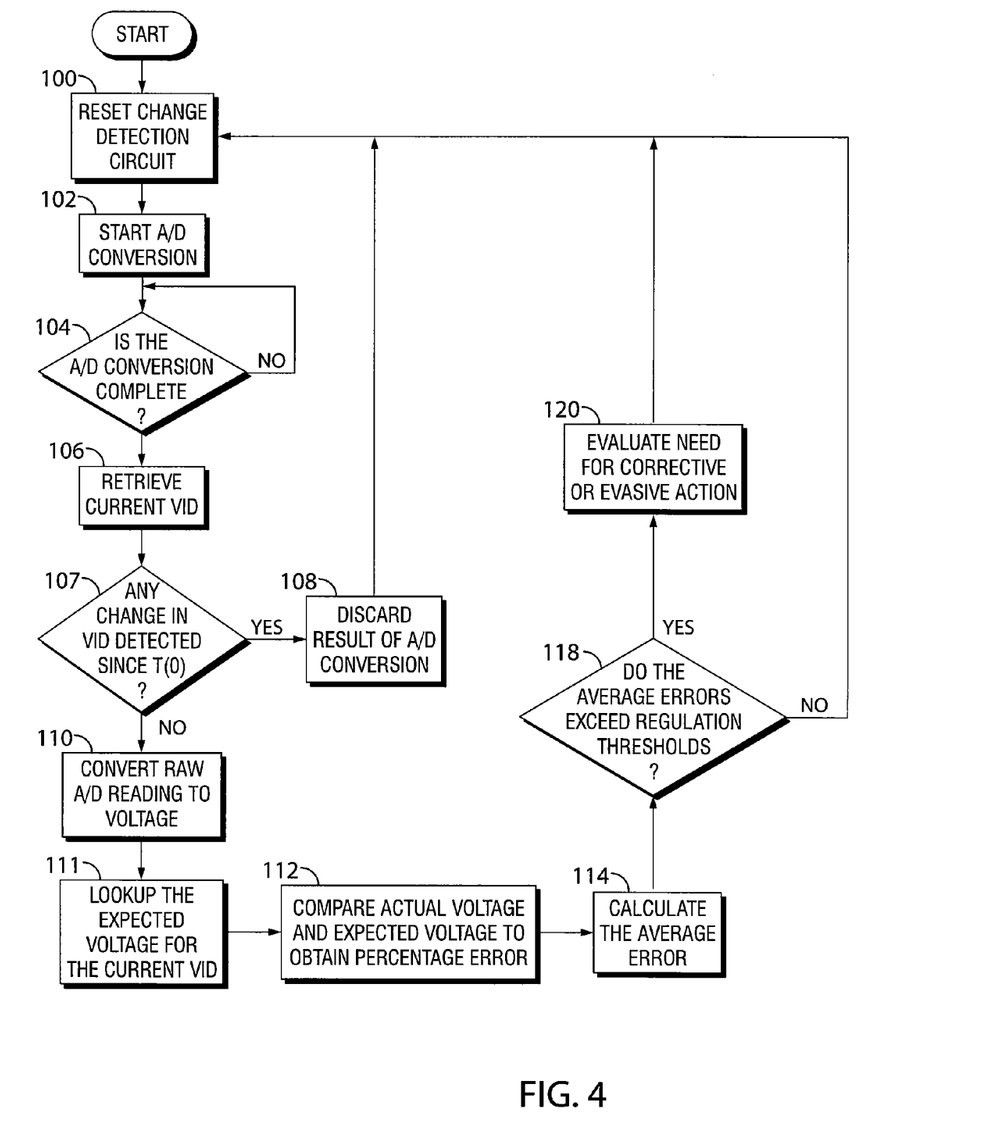
FIG. 4 is a flowchart outlining one embodiment of a method of monitoring a dynamic voltage supplied to a processor in response to a dynamic VID generated by the processor.

FIG. 4 is a flowchart outlining one embodiment of a method of monitoring a dynamic voltage supplied to a processor in response to a dynamic VID generated by the processor. Reference numerals provided in FIG. 4 for referring to steps do not imply a required sequence of steps in the numerical order of the reference numerals. The method may be performed on the system 10 of FIG. 3, for example. The change detection circuit is reset in step 100, such as by setting the change detection bit to 0, so that any new change can be detected. The voltage supplied to the processor in response to the current VID is sensed as an analog value, in that the voltage sensed has a continuously variable quality, and an analog to digital (A/D) conversion is initiated at time T(0) in step 102. In step 104, it is determined whether the analog to digital conversion is completed. If the A/D conversion is not complete, the process loops back to step 104, until the conversion is complete. Once the A/D conversion is completed, in step 106 the current VID is retrieved. Step 107 includes identifying whether any VID changes occurred while the A/D conversion was in process. Identifying a change in the VID is typically performed by examining the change detection register, such as by noting whether a change detection bit currently has a value of 1. If any VID changes did occur during the A/D conversion, then the results of the A/D conversion are discarded in step 108, and a new A/D conversion is then begun using the current VID settings (steps 100, 102, and 104 are repeated). However, if the VID did not change during the A/D conversion, then the raw A/D reading is converted to voltage in step 110. The voltage that is expected on the basis of the current VID is obtained by a lookup in a known data table or curve, in step 111. Then in step 112, the digital value of the actual voltage and the expected voltage are compared in order to obtain a percentage error value.

The "expected voltage" is the value of the voltage expected in response to the VID, which may be obtained from a data table or curve. The error between the expected voltage (as indicated by the VID) and the actual voltage (as indicated by the digital voltage value) are recorded and the error is averaged in step 114. It should be recognized that these errors may be analyzed by statistical techniques other than taking a simple average. It is then determined whether the average errors, or some analytical representation of the recorded errors, exceed regulation thresholds in step 118. If the average error does not exceed the regulation thresholds, then the process returns to step 100. However, if the average error does exceed the regulation thresholds, then the need for corrective or evasive action is evaluated in step 120.

This evaluation in step 120 may not necessarily trigger an immediate or "emergency" response. Rather, the circumstances may be weighed in order to determine the appropriate response, if any. For example, if a system has historically performed within regulation thresholds, and the average error has gradually grown to slightly exceed the regulation thresholds, an alert may be generated for consideration by a system administrator without necessitating immediate action. For example, the system administrator may consider over the course of hours, days, or even weeks whether the processor, VRM, or other associated hardware needs replacement. Alternatively, for example, if the processor suddenly and dramatically shifts from operating well within regulation thresholds to operating far outside the regulation thresholds, or begins operating constantly at the maximum or minimum voltage (or no voltage at all), with little or no correlation to the VID, the exigency of those circumstances may warrant the need for more immediate action. Examples of such action include throttling the processor, shutting down the processor, the VRM, of any system on which they reside, shifting workload from the processor to another processor in a data center, or even powering off the hardware on which the processor and VRM reside.

It should be recognized that the invention may take the form of an embodiment containing hardware and/or software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 5:
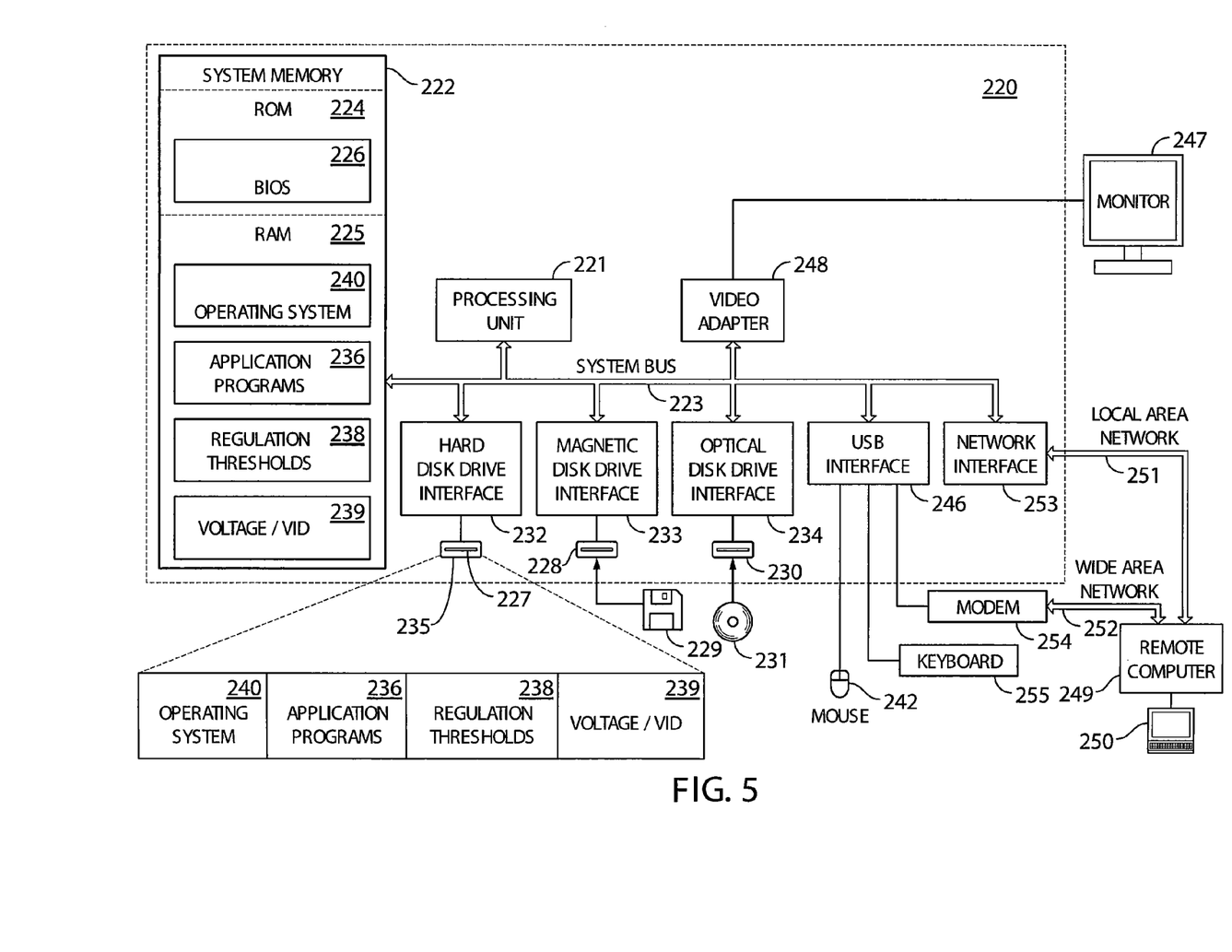
FIG. 5 is a schematic diagram of a computer system in which a dynamic CPU voltage may be monitored and analyzed according to an embodiment of the invention.

FIG. 5 is a schematic diagram of a computer system generally indicated at 220 that may be configured for monitoring a dynamic CPU voltage according to an embodiment of the invention. The computer system 220 may be a general-purpose computing device in the form of a conventional computer system 220. Generally, computer system 220 includes a processing unit 221, which may contain one or more dynamic-voltage CPUs whose voltage is to be monitored according to the invention. The computer system 220 also includes a system memory 222 and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

Computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 6. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet. Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. A voltage regulation thresholds database 238 may be included, which may include a specification of the range of allowable error between actual and expected voltage for one or more CPUs whose voltage is to be monitored. This database may specify a margin of error such as shown in FIG. 2. A Voltage/VID database 239 may also be included, which may include data relating the range of possible VID values and corresponding expected voltage values for the one or more CPUs. For example, the CPU properties database 239 may contain the characteristic curve or table for each CPU, an example of which is also shown in FIG. 2. Alternatively, the voltage regulation thresholds and CPU properties may be contained on a microcontroller that is a component of a voltage monitoring system according to the invention.

Aspects of the present invention may be implemented in the form of application program 236. Application program 236 may be informed by or otherwise associated with voltage regulation thresholds database 238 and/or Voltage/VID database 239. The application program 236 generally comprises computer-executable instructions for monitoring the dynamic CPU voltage according to the invention.

Figure 6:
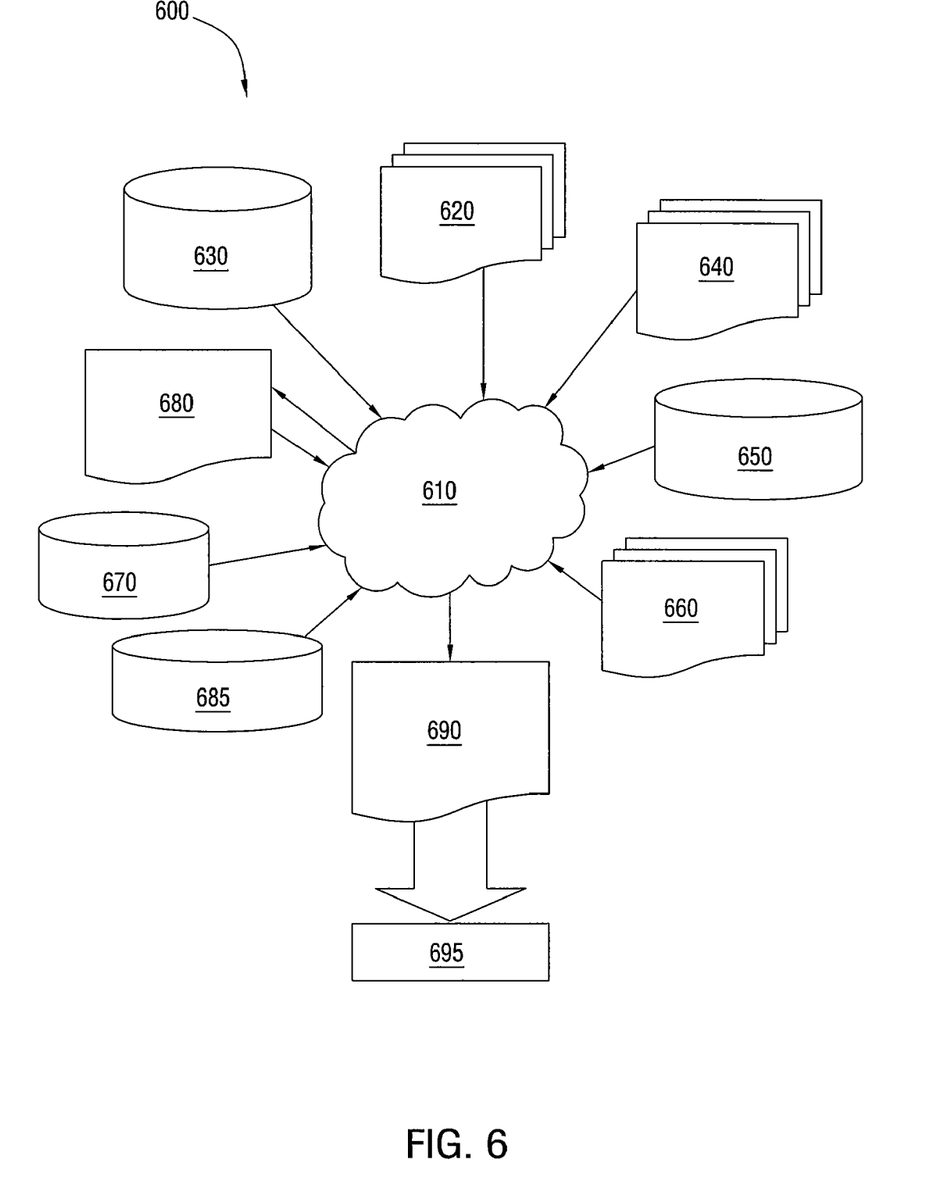
FIG. 6 is a flow diagram of a design process used in semiconductor design, manufacture, and/or test.

FIG. 6 shows a block diagram of an exemplary design flow 600 used for example, in semiconductor design, manufacturing, and/or test. Design flow 600 may vary depending on the type of IC being designed. For example, a design flow 600 for building an application specific IC (ASIC) may differ from a design flow 600 for designing a standard component. Design structure 620 is preferably an input to a design process 610 and may come from an IP provider, a core developer, or other design company or may be generated by the operator of the design flow, or from other sources. Design structure 620 comprises the circuits described above and shown in FIGS. 1, 2, and 5 in the form of schematics or HDL, a hardware-description language (e.g., Verilog, VHDL, C, etc.). Design structure 620 may be contained on one or more machine readable medium. For example, design structure 620 may be a text file or a graphical representation of a circuit as described above and shown in FIGS. 1, 2, and 5. Design process 610 preferably synthesizes (or translates) the circuit described above and shown in FIGS. 1, 2, and 5 into a netlist 680, where netlist 680 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist (680) is resynthesized one or more times depending on design specifications and parameters for the circuit.

Design process 610 may include using a variety of inputs; for example, inputs from library elements 630 which may house a set of commonly used elements, circuits, and devices, including models, layouts, and symbolic representations, for a given manufacturing technology (e.g., different technology nodes, 32 nm, 45 nm, 90 nm, etc.), design specifications 640, characterization data 650, verification data 660, design rules 670, and test data files 685 (which may include test patterns and other testing information). Design process 610 may further include, for example, standard circuit design processes such as timing analysis, verification, design rule checking, place and route operations, etc. One of ordinary skill in the art of integrated circuit design can appreciate the extent of possible electronic design automation tools and applications used in design process 610 without deviating from the scope and spirit of the invention. The design structure of the invention is not limited to any specific design flow.

Design process 610 preferably translates a circuit as described above and shown in FIGS. 1, 2, and 5, along with any additional integrated circuit design or data (if applicable), into a second design structure 690. Design structure 690 resides on a storage medium in a data format used for the exchange of layout data of integrated circuits (e.g. information stored in a GDSII (GDS2), GL1, OASIS, or any other suitable format for storing such design structures). Design structure 690 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1, 2, and 5. Design structure 690 may then proceed to a stage 695 where, for example, design structure 690: proceeds to tape-out, is released to manufacturing, is released to a mask house, is sent to another design house, is sent back to the customer, etc.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A design structure embodied in a non-transitory machine readable storage medium for at least one of designing, manufacturing, and testing a design, the design structure comprising:
    a system for monitoring a dynamic processor voltage, the system comprising:
        a voltage regulation module for supplying a voltage to a processor in relation to a VID generated by the processor;
        an analog to digital converter for converting an analog value of the supplied voltage to a digital value;
        a change detection module for detecting any change in the value of the VID during the analog to digital conversion; and
        a validation module for comparing the supplied voltage to a voltage expected in relation to the VID and computing a difference between the expected voltage and the supplied voltage,
        wherein the system is configured for accepting the digital value of the supplied voltage and the value of the VID during the analog to digital conversion unless a change in the value of the VID is detected during the analog to digital conversion.

2. The design structure of claim 1, further comprising at least one microcontroller, wherein one or both of the analog to digital converter and the change detection module are included with the at least one microcontroller.

3. The design structure of claim 2, wherein the analog to digital converter and the change detection module reside on the same microcontroller.

4. The design structure of claim 1, wherein the change detection module comprises a change detection bit selectively resettable by the validation module.

5. The design structure of claim 1, wherein the change detection module comprises a plurality of latch settings for storing VID values.

6. The design structure of claim 1, wherein the processor, voltage regulation module, and voltage monitoring system are disposed on a common motherboard.

7. The design structure of claim 1 further comprising a netlist that describes the system.

8. The design structure of claim 1, wherein the design structure resides on the non-transitory machine readable storage medium as a data format used for an exchange of layout data of integrated circuits.

9. The design structure of claim 1, wherein the validation module compares the computed difference with a predefined threshold and adjusts one or more processor parameters upon determining that the computed difference exceeds the predefined threshold.

10. The design structure of claim 9, wherein adjusting the one or more processor parameters comprises at least one of reducing the voltage supplied to the processor, turning off the processor, reducing a processor load on the processor, and shifting processor load from the processor to another processor.

11. A design structure embodied in a non-transitory machine readable storage medium for at least one of designing, manufacturing, and testing a design, the design structure comprising:
    a system for monitoring a dynamic processor voltage, the system comprising:
        a voltage regulation module for supplying a voltage to a processor in relation to a VID generated by the processor;
        an analog to digital converter for converting an analog value of the supplied voltage to a digital value;
        a validation module for comparing the supplied voltage to a voltage expected in relation to the VID and computing a difference between the expected voltage and the supplied voltage; and
        a change detection module for detecting any change in the value of the VID during the analog to digital conversion, wherein the change detection module comprises a change detection bit selectively resettable by the validation module.

12. The design structure of claim 11, further comprising at least one microcontroller, wherein one or both of the analog to digital converter and the change detection module are included with the at least one microcontroller.

13. The design structure of claim 12, wherein the analog to digital converter and the change detection module reside on the same microcontroller.

14. The design structure of claim 11, wherein the change detection module comprises a plurality of latch settings for storing VID values.

15. The design structure of claim 11, wherein the processor, voltage regulation module, and voltage monitoring system are disposed on a common motherboard.

16. The design structure of claim 11, further comprising a netlist that describes the system.

17. The design structure of claim 11, wherein the design structure resides on the non-transitory machine readable storage medium as a data format used for an exchange of layout data of integrated circuits.

18. The design structure of claim 11, wherein the validation module compares the computed difference with a predefined threshold and adjusts one or more processor parameters upon determining that the computed difference exceeds the predefined threshold.

19. The design structure of claim 18, wherein adjusting the one or more processor parameters comprises at least one of reducing the voltage supplied to the processor, turning off the processor, reducing a processor load on the processor, and shifting processor load from the processor to another processor.

20. A design structure embodied in a non-transitory machine readable storage medium for at least one of designing, manufacturing, and testing a design, the design structure comprising:
　a system for monitoring a dynamic processor voltage, the system comprising:
　　a voltage regulation module for supplying a voltage to a processor in relation to a VID generated by the processor;
　　an analog to digital converter for converting an analog value of the supplied voltage to a digital value;
　　a change detection module for detecting any change in the value of the VID during the analog to digital conversion, wherein the change detection module comprises a plurality of latch settings for storing VID values; and
　　a validation module for comparing the supplied voltage to a voltage expected in relation to the VID and computing a difference between the expected voltage and the supplied voltage.

* * * * *